United States Patent [19]

Hari et al.

[11] Patent Number: 4,946,948
[45] Date of Patent: Aug. 7, 1990

[54] MONO AND DISAZO COMPOUNDS BASED ON B-HYDROXY-NAPHTHOIC ACID DERIVATIVES OR ACETOACETARYLIDE DERIVATIVES CONTAINING LONG-CHAIN ALKYL ESTER OR ALKYLAMIDE RADICALS

[75] Inventors: Stefan Hari, Reinach; Fridolin Bäbler, Marly, both of Switzerland

[73] Assignee: Ciba-Geigy Corporation, Ardsley, N.Y.

[21] Appl. No.: 401,349

[22] Filed: Aug. 31, 1989

[30] Foreign Application Priority Data

Sep. 7, 1988 [CH] Switzerland ............ 3363/88
Mar. 30, 1989 [CH] Switzerland ............ 1160/89

[51] Int. Cl.$^5$ ............ C09B 29/10; C09B 33/147; C09B 33/153; D06P 3/79
[52] U.S. Cl. ............ 534/651; 534/739; 534/820; 534/862; 534/874; 534/591; 534/887; 534/595; 534/748; 534/734; 534/830; 534/575; 106/22; 106/23; 106/496
[58] Field of Search ............ 534/651, 739, 820, 862, 534/874

[56] References Cited

U.S. PATENT DOCUMENTS

| | | | |
|---|---|---|---|
| 2,155,493 | 4/1939 | Knight et al. ............ | 534/651 |
| 2,774,755 | 12/1956 | Schmid et al. ............ | 534/820 |
| 2,888,452 | 5/1959 | Schmid et al. ............ | 534/874 X |
| 2,888,453 | 5/1959 | Schmid et al. ............ | 534/820 |
| 3,137,688 | 6/1964 | Ronco ............ | 534/820 |
| 3,459,730 | 8/1969 | Schnabel et al. ............ | 534/820 |
| 3,562,249 | 2/1971 | Schnabel et al. ............ | 534/820 |
| 4,003,886 | 1/1977 | Muller ............ | 534/575 |
| 4,065,488 | 12/1977 | Chou et al. ............ | 549/454 |
| 4,392,999 | 7/1983 | Müller et al. ............ | 534/801 |
| 4,689,403 | 8/1987 | Ronco ............ | 534/874 |

FOREIGN PATENT DOCUMENTS

2952759 7/1981 Fed. Rep. of Germany ...... 534/651
56-166266 12/1981 Japan ............ 534/651

Primary Examiner—Floyd D. Higel
Assistant Examiner—Fiona T. Powers
Attorney, Agent, or Firm—JoAnn Villamizar

[57] ABSTRACT

Compounds of formula I:

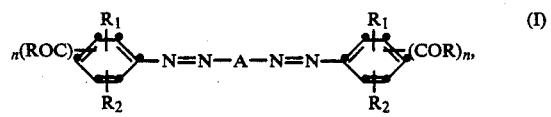

wherein R is a radical of the formula —$OR_3$ or —$NHR_3$, A is a radical of formula II or III:

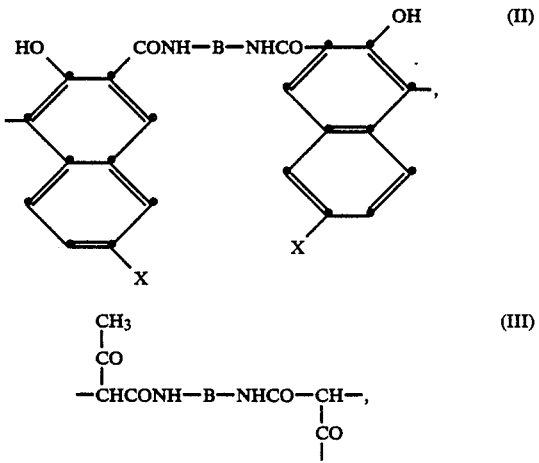

B is a radical of the formula n is the number 1 or 2, $R_1$ is —H or —Cl, $R_2$ is —H, halogen, —$NO_2$, —CN, $C_1$-$C_4$ alkyl, $C_1$-$C_4$ alkoxy, —$CF_3$, $C_2$-$C_5$ alkoxycarbonyl or —CONH-phenyl, —NHCO-phenyl or phenoxy which is unsubstituted or substituted on the phenyl ring by one or two chlorine atoms or one or two methyl, methoxy or ethoxy groups, $R_3$ is alkyl containing at least 10 C atoms, $R_4$ and $R_5$ are each independently of the other —H, halogen, —$NO_2$, —CN, —$CF_3$, $C_1$-$C_4$ alkyl or $C_1$-$C_4$ alkoxy, $R_6$ is —H, —Cl, —Br, —$CH_3$ or —$OCH_3$ and X is —H, —Br, —$OCH_3$, —CN or —$NO_2$, are suitable as pigments, especially for coloring polyolefins, as well as novel intermediates of the formula (Abstract continued on next page.)

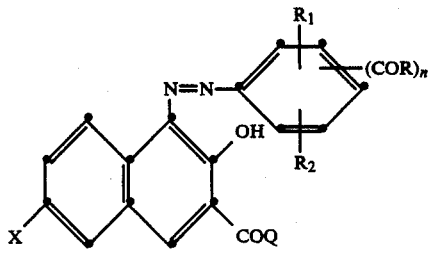

wherein n is the number 1 or 2, R is a radical of the formula —OR$_3$ or —NHR$_3$, R$_1$ is —H or —Cl, R$_2$ is —H, halogen, —NO$_2$, —CN, C$_1$–C$_4$ alkyl, C$_1$–C$_4$ alkoxy, —CF$_3$, C$_2$–C$_5$ alkoxycarbonyl or —CONH-phenyl, —NHCO-phenyl or phenoxy which is unsubstituted or substituted on the phenyl ring by one or two chlorine atoms or one or two methyl, methoxy or ethoxy groups, R$_3$ is alkyl containing at least 10 C atoms, X is —H, —Br, —OCH$_3$, —CN or —NO$_2$ and Q is —OH or halogen.

11 Claims, No Drawings

MONO AND DISAZO COMPOUNDS BASED ON B-HYDROXY-NAPHTHOIC ACID DERIVATIVES OR ACETOACETARYLIDE DERIVATIVES CONTAINING LONG-CHAIN ALKYL ESTER OR ALKYLAMIDE RADICALS

The present invention relates to novel disazo compounds containing long-chain alkyl ester or alkylamide radicals and to their use for coloring high-molecular organic material, especially polyolefins.

Azo pigments containing ester radicals have been known for a long time. Red disazo pigments have been disclosed e.g. in U.S. Pat. Nos. 3,137,688 and 4689403, while yellow disazo compounds have been disclosed e.g. in U.S. Pat. Nos. 4,003,886 and 4,065,488. A main feature of the compounds listed in said patents is the fact that they have at least four alkyl ester radicals, the alkyl radical containing up to a maximum of 4 C atoms. Monoazo pigments containing a lower alkyl ester radical are also known, e.g. according to U.S. Pat. No. 4,392,999. Disazo pigments containing alkylamide groups have been disclosed e.g. in U.S. Pat. No. 3,562,249.

Although such products generally possess good pigment properties, they do not always satisfy modern technological demands, e.g. because of low heat stability and/or inadequate dispersibility.

It has now been found, surprisingly, that disazo pigments containing at least two long-chain alkyl ester or alkylamide radicals are very suitable for coloring high-molecular organic materials, especially polyolefins, said pigments having an improved dispersibility, a low tendency to blooming and excellent pigment properties.

The present invention accordingly relates to compounds of formula I:

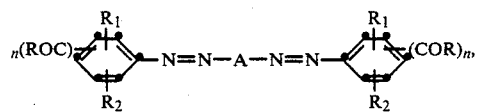

wherein R is a radical of the formula —OR$_3$ or —NHR$_3$, A is a radical of formula II or III:

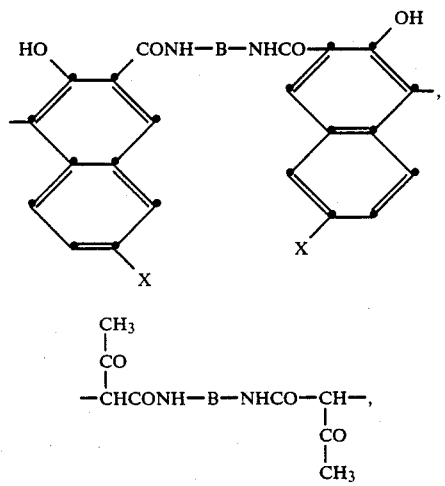

B is a radical of the formula

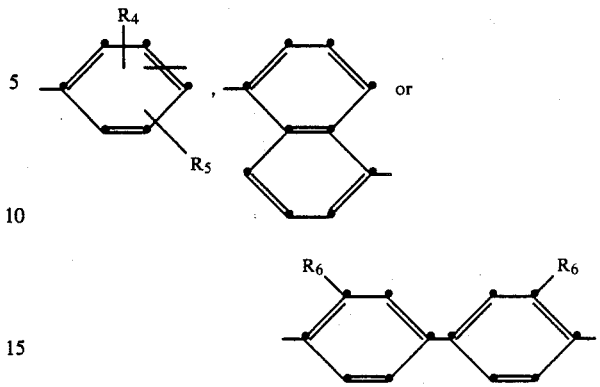

n is the number 1 or 2, R$_1$ is —H or —Cl, R$_2$ is —H, halogen, —NO$_2$, —CH, C$_1$-C$_4$ alkyl, C$_1$-C$_4$ alkoxy, —CF$_3$, C$_2$-C$_5$ alkoxycarbonyl or —CONH-phenyl, —NHCO-phenyl or phenoxy which is unsubstituted or substituted on the phenyl ring by one or two chlorine atoms or one or two methyl, methoxy or ethoxy groups, R$_3$ is alkyl containing at least 10 C atoms, R$_4$ and R$_5$ are each independently of the other —H, halogen, —NO$_2$, —CN, —CF$_3$, C$_1$-C$_4$ alkyl or C$_1$-C$_4$ alkoxy, R$_6$ is —H, —Cl, —Br, —CH$_3$ or —OCH$_3$ and X is —H, —Br, —OCH$_3$, —CN or —NO$_2$.

Halogen in the groups listed above is fluorine, bromine or, in particular, chlorine.

R$_2$, R$_4$ and R$_5$ as C$_1$-C$_4$ alkyl are methyl, ethyl, n-propyl, isopropyl, n-butyl, isobutyl or tert-butyl.

R$_2$, R$_4$ and R$_5$ as C$_1$-C$_4$ alkoxy are e.g. methoxy, ethoxy. n-propoxy, isopropoxy, n-butoxy or tert-butoxy.

R$_2$ as C$_2$-C$_5$ alkoxycarbonyl is e.g. methoxycarbonyl, ethoxycarbonyl, n-propoxycarbonyl, isopropoxycarbonyl, n-butoxycarbonyl or tert-butoxycarbonyl.

The radicals B in formulae II and III are derived from m-phenylene-diamines and especially p-phenylenediamines of the following formulae:

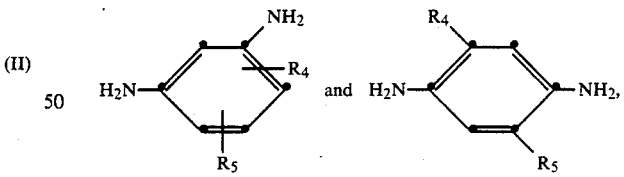

wherein R$_4$ and R$_5$ are as defined above.

Examples of such diamines are: 1,4-diaminobenzene, 1,4-diamino-2-chlorobenzene, 1,4-diamino-2-bromobenzene, 1,4-diamino-2,5-dichloro-benzene, 1,4-diamino-2-methylbenzene, 1,4-diamino-2,5-dimethylbenzene, 1,4-di-amino-2-methoxybenzene, 1,4-diamino-2,5-dimethoxybenzene, 1,4-diamino-5-methoxy-1,4-phenylenediamine, 2-methyl-5-methoxy-1,4-phenylenediamine, 1,3-diaminobenzene, 1,3-diamino-2-methylbenzene, 1,3-diamino-4-chlorobenzene and 1,3-diamino-4-methylbenzene.

Examples of diamines derived from the radical of the formula

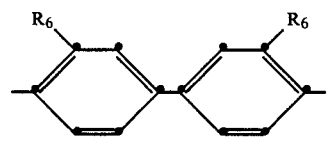

are: 3,3'-dichlorobenzidine, 3,3'-dibromobenzidine, 3,3'-dimethylbenzidine and 3,3'-dimethoxybenzidine.

Alkyl containing at least 10 C atoms (in the radical —OR$_3$ or —NHR$_3$) is branched or linear alkyl, e.g. n-decyl, n-dodecyl, n-tridecyl, iso-tridecyl, n-tetradecyl (myristyl), n-pentadecyl, n-hexadecyl. 1-methylpentadecyl, n-octadecyl, n-eicosyl, n-tetracosyl, n-hexacosyl, n-triacontyl or n-pentacontyl.

R$_3$ as alkyl is preferably C$_{12}$ to C$_{35}$ alkyl, especially C$_{12}$ to C$_{18}$ alkyl, or mixtures thereof, e.g. the mixtures of alcohols known and marketed as alfols, which have essentially alkyl groups containing the same number of C atoms and are predominantly branched, and which are used as starting materials. The alkyl groups in the alcohols are denoted by the term "alfyl", e.g. alfyl-C$_{12}$ or alfyl-C$_{14}$.

Compounds of formula I in which formula I has the following structure:

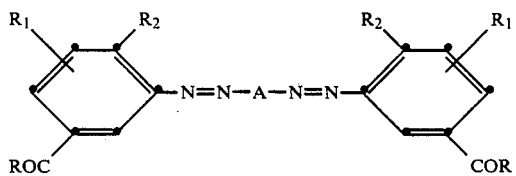

and the groups R, R$_1$, R$_2$ and A are as defined above are preferred.

Compounds of formula I in which formulae II and III have the following structures:

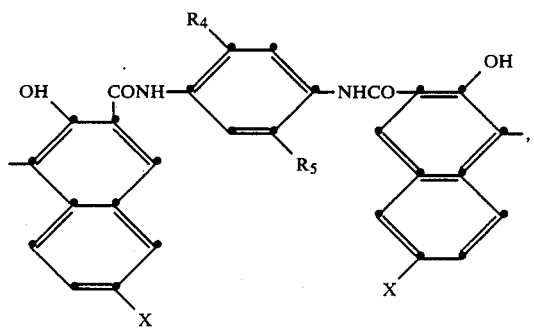

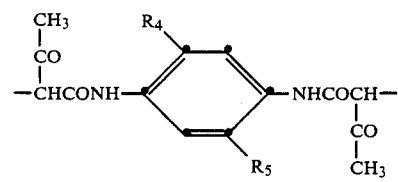

and the groups R$_4$, R$_5$ and X are as defined above are also preferred.

Compounds of formula IV:

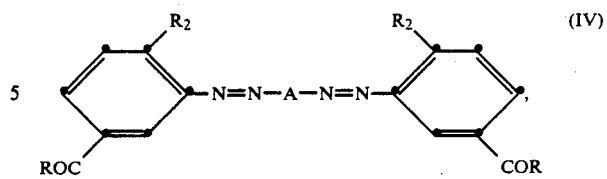

wherein A is a radical of formula V or VI:

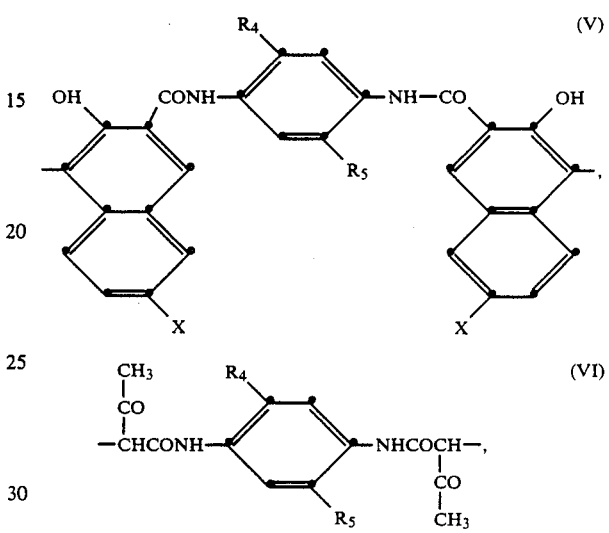

R is a radical of the formula —OR$_3$ or —NHR$_3$, R$_2$ is —H,
, —CH$_3$, —OCH$_3$, —OC$_2$H$_5$, —COOCH$_3$, —COOC$_2$H$_5$ or —OC$_6$H$_5$, R$_3$ is C$_{12}$-C$_{35}$ alkyl and R$_4$ and R$_5$ are independently of the other —H, —Cl, —CH$_3$, —OCH$_3$ or —OC$_2$H$_5$. R is most preferably a radical of the formula —OR$_3$.

In formula IV, A is preferably a radical of formula V, especially a radical of formula V in which R$_2$ is —Cl, —CH$_3$ or —OCH$_3$, R$_3$ is C$_{12}$-C$_{18}$ alkyl and R$_4$ and R$_5$ are each independently of the other —H, —Cl, —CH$_3$ or —OCH$_3$.

The compounds of formula I are preferably symmetrical compounds, in which the two diazo components are identical. Asymmetrical compounds, in which the two diazo components are different, also come within the definition of formula I above.

The compounds of formula I can be prepared by processes known per se, e.g.:
 (a) by condensing 2 mol of a carboxylic acid halide, especially a chloride of the formula

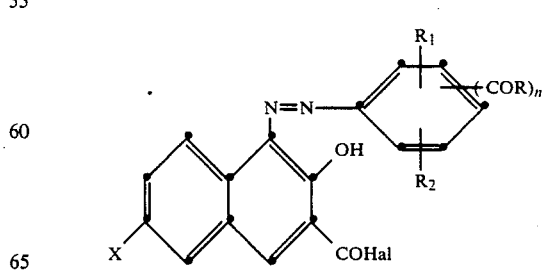

with a diamine of the formula H$_2$N—NH$_2$, especially H$_2$N—B—NH$_2$, in particular

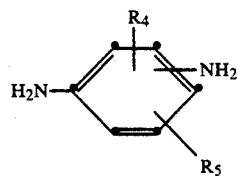

e.g. according to U.S. Pat. No. 4,689,403, or by condensing 1 mol of a carboxylic acid halide of the formula

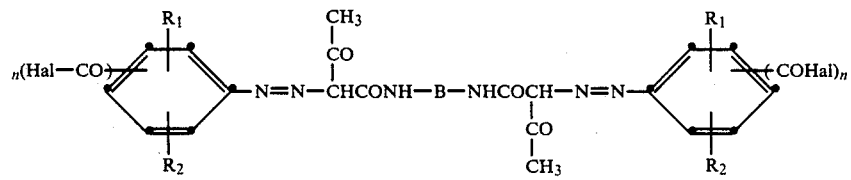

with 2 mol (where n=1) or 4 mol (where n=2) of a long-chain alkyl-alcohol or alkylamine, e.g. according to U.S. Pat. No. 4,065,448, or (b) by diazotizing an amine of the formula

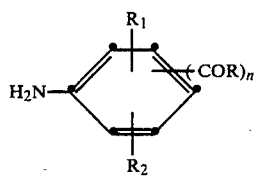

and then coupling the resulting diazo component with a coupling component of the formula

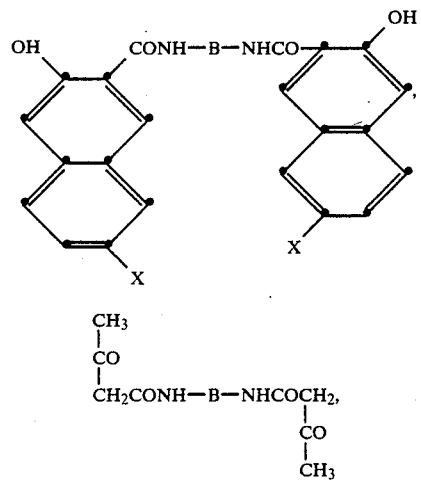

e.g. according to U.S. Pat. No. 4,003,886, the groups n, B, R, $R_1$ to $R_6$, Hal and X being as defined above.

The above coupling components are known intermediates; on the other hand, the carboxylic acid halides based on B-oxynaphthoic acid, and their corresponding acids, are novel intermediates. They can be obtained by known processes, e.g. according to US patent no. 4689403.

The invention therefore further relates to compounds of the following formula VII:

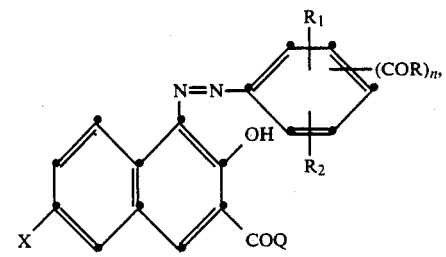

wherein n is the number 1 or 2, R is a radical of the formula $-OR_3$ or $-NHR_3$, $R_1$ is $-H$ or $-Cl$, $R_2$ is $-H$, halogen, $-NO_2$, $-CN$, $C_1-C_4$ alkyl, $C_1-C_4$ alkoxy, $-CF_3$, $C_2-C_5$ alkoxycarbonyl or $-CONH$-phenyl, $-NHCO$—phenyl or phenoxy which is unsubstituted or substituted on the phenyl ring by one or two chlorine atoms or one or two methyl, methoxy or ethoxy groups, $R_3$ is alkyl containing at least 10 C atoms, X is $-H$, $-Br$, $-OCH_3$, $-CN$ or $-NO_2$ and Q is $-OH$ or halogen, especially $-Cl$.

For the interpretation of $C_1-C_4$ alkyl, $C_1-C_4$ alkoxy, $C_2-C_5$ alkoxycarbonyl and $R_3$, reference is made to the corresponding definitions already listed above.

Preferred compounds of formula VII have formula VIII:

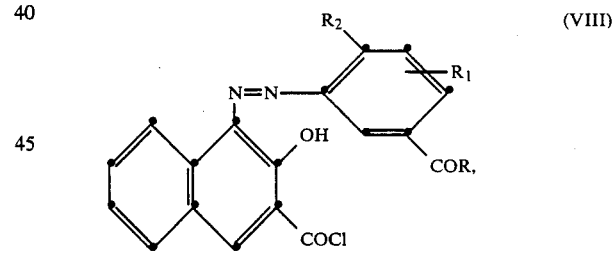

wherein R, $R_1$ and $R_2$ are as defined above.

Especially preferred compounds are those of formula VIII in which $R_1$ is $-H$, $R_2$ is $-Cl$, $-CH_3$ or $-OCH_3$ and R is a radical of the formula $-OR_3$, $R_3$ being $C_{12}-C_{18}$ alkyl.

A preferred preparatory process is the condensation process according to scheme (a) above. The condensation is conveniently carried out in the presence of an inert organic solvent under normal or over pressure, with or without a catalyst. Examples of suitable solvents are toluene, chlorobenzene, dichlorobenzenes such as o-dichlorobenzene, trichlorobenzenes, nitrobenzene or mixtures of aromatic and/or aliphatic solvents, such as ®Shellsole.

However, the compounds of formula I can also be prepared via a transesterification or amidation reaction by transesterifying or transamidating a compound of the formula

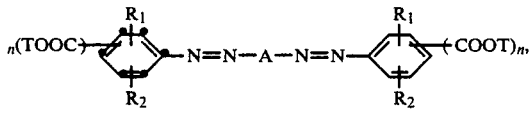

wherein T is $C_1$–$C_3$ alkyl and the other radicals A, $R_1$ and $R_2$, and n, are as defined above, with an alcohol or an amine of the formula $R_3$—OH or $R_3NH_2$, by known processes, to give compounds of formula I. T is methyl, ethyl, propyl or isopropyl.

The reaction is conveniently carried out direct in an excess of the appropriate long-chain alcohol or amine or in the presence of an organic solvent, e.g. toluene, xylenes, dichlorobenzenes, nitrobenzene, chloronaphthalene, anisole, ®Dowtherm or ketones such as cyclohexanone, at elevated temperature, e.g. in the boiling range of the solvent used, under normal pressure or positive pressure, with or without catalysts. If catalysts are used, suitable examples are sulfuric acid, p-toluenesulfonic acid, methylsulfonic acid, LiH, $LiNH_2$, $NaOCH_3$, potassium tert-butoxide, tetraalkyltitanates, dibutyltin oxide or rare earths.

The resulting compounds of formula I are isolated in conventional manner, e.g. by filtration. The material on the suction filter is washed with one of the solvents already indicated above and then conveniently with water as well. Said compounds are generally obtained in good yield and purity and can be used in finely divided form, without further purification, e.g. for coloring high-molecular organic material.

If their purity and/or particle shape and size are not yet adequate or optimum for use as pigments, the compounds of the present patent application can be conditioned further. Conditioning is understood as meaning the production of a fine particle shape and size optimum for the application, for example by dry grinding with or without salt, by grinding with solvent or water, by kneading with salt or by means of a subsequent heat treatment with solvent.

Heat treatments with solvents can be carried out e.g. in organic solvents, preferably those with a boiling point above 100° C.

Solvents which prove particularly suitable for this purpose are benzenes substituted by halogen atoms or alkyl or nitro groups, such as toluene, chlorobenzene, o-dichlorobenzene, xylenes or nitrobenzene, alcohols such as isopropanol or isobutanol, ketones such as cyclohexanone, ethers such as ethylene glycol monomethyl or monoethyl ether, amides such as dimethylformamide or N-methylpyrrolidone, and dimethyl sulfoxide, sulfolan or water by itself, if necessary under pressure. The aftertreatment can also be carried out in water in the presence of organic solvents and/or with the addition of surface-active substances or aliphatic amines, or in liquid ammonia.

Depending on the conditioning process and/or intended application, it may be advantageous to add certain amounts of texture-improving agents to the compound of formula I of the present patent application, before or after the conditioning process. Suitable texture-improving agents are, in particular, fatty acids containing at least 18 C atoms, for example stearic or behenic acid, or amides or metal salts thereof, especially Mg salts, and plasticizers, waxes, resin acids such as abietic acid, rosin soap, alkylphenols or aliphatic alcohols such as stearyl alcohol, or vicinal diols such as dodecane-1,2-diol, as well as modified rosin/maleate resins or fumaric acid/rosin resins. The texture-improving agents are preferably added in amounts of 0.1–30% by weight, especially 2–15% by weight, based on the end product.

High-molecular organic material can be of natural or synthetic origin. It can be e.g. natural resins or siccative oils, rubber or casein, or modified natural substances such as chlorinated rubber, oil-modified alkyd resins, viscose or cellulose ethers or esters such as cellulose acetate, cellulose propionate, cellulose acetobutyrate or nitrocellulose, but in particular fully synthetic organic polymers (duroplasts and thermoplasts) such as those obtained by polymerization, polycondensation or polyaddition. Particular members from the class of the polymerization resins are: polyolefins such as polyethylene, polypropylene or polyisobutylene, and substituted polyolefins such as polymers of vinyl chloride, vinyl acetate, styrene, acrylonitrile, acrylic and/or methacrylic acid esters or butadiene, as well as copolymers of said monomers, especially ABS, EVA or acrylic acid/styrene/acrylonitrile (ASA).

Members from the class of the polyaddition resins and polycondensation resins are the condensation products of formaldehyde with phenols, i.e. phenoplasts, and the condensation products of formaldehyde with urea, thiourea and melamine, i.e. aminoplasts, the polyesters used as enamel resins, including both saturated resins, e.g. alkyd resins, and unsaturated resins, for example maleate resins, as well as linear polyesters, polycarbonates, polyurethanes and polyamides or silicones.

Said high-molecular compounds can be used individually or in mixtures as plastic materials or melts, which can be spun into fibers if desired.

They can also be used in the polymerized state, in dissolved form, as film-forming agents or binders for enamels or printing inks, examples being boiled linseed oil, nitrocellulose, alkyd resins, melamine resins and urea/formaldehyde resins or acrylic resins.

The pigmentation of the high-molecular organic substances with the compounds of formula I as defined is carried out for example by mixing such a compound, if desired in the form of masterbatches, with these substrates using rolling mills, mixers or grinders. The pigmented material is then converted to the desired final form by processes known per se, such as calandering, compression moulding, extrusion, coating, spinning, casting or injection molding. It is often desirable to incorporate so-called plasticizers into the high-molecular compounds prior to shaping, in order to produce non-rigid molded articles or to reduce their brittleness. Examples of plasticizers which can be used are esters of phosphoric acid, phthalic acid or sebacic acid. The plasticizers can be incorporated into the polymers before or after the incorporation of the pigment. As a further possibility, aimed at producing different shades, fillers or other coloring constituents, such as white, colored or black pigments, are also added to the high-molecular organic substances in any desired amounts, as well as the compounds of the invention.

For pigmenting enamels and printing inks, the high-molecular organic materials and the compounds of formula I, if necessary together with additives such as fillers, other pigments, siccatives or plasticizers, are finely dispersed or dissolved in a common organic solvent or solvent mixture. This can be done by dispersing or dissolving the individual components separately, or else several together, and only then bringing all the components together.

The compositions of substances of the present patent application preferably contain 0.01–20% by weight of a compound of formula I as defined, for example in plastics, fibers, enamels and prints, and are distinguished by good dispersibility, good resistance to overcoating, migration, heat, light and weather. good color strength and a good gloss.

However, the compounds of formula I are preferably used for coloring polyolefins.

Examples of polyolefins are high and low density polyethylene (HD-PE, LD-PE and LLD-PE), polypropylene and polyisobutylene, as well as copolymers of polyolefins with e.g. polyethers, polyether-ketones or polyurethanes.

Coloring is carried out by conventional processes, for example by mixing a compound of formula I with the polyolefin granules or powder and extruding the mixture to form fibers, sheets or granules. The latter can then be shaped into articles by injection moulding.

The colorings obtained exhibit high purity and high saturation and are distinguished by an excellent dispersibility, by good general resistance properties, especially to heat and light, and by their low tendency to blooming. A particular advantage of polyethylene articles colored with the compounds of formula I of the invention is that they do not have an increased susceptibility to distortion and deformation phenomena, especially in the case of HD-PE. They additionally exhibit a high acid resistance.

The plastic fibers mass-colored with the compounds of formula I of the invention, e.g. PP fibers, possess excellent textile properties such as light stability and wet resistance to detergents and solvents.

The following Examples will serve to illustrate the invention.

EXAMPLE 1A 18 g of the azo dye formed from diazotized stearyl 4-methyl-3-aminobenzoate and 2-hydroxy-3-naphthoic acid are suspended in 150 g of anhydrous toluene. 4.9 g of thionyl chloride and 6 drops of dimethylformamide are added to the mixture, which is heated at 67° to 68° C. for one hour, with stirring. The dark solution is concentrated to dryness under vacuum. The resulting product is then removed from the flask with 50 ml of petroleum ether, isolated by suction filtration and dried under vacuum at 50° C. to give 16.95 g (91% of theory) of the azo dye carboxylic acid chloride of the formula

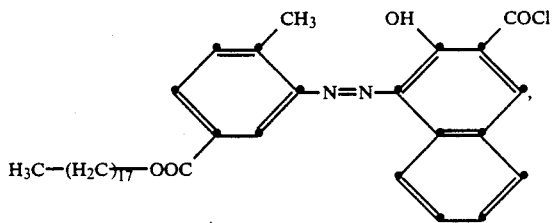

which melts at 107° to 108° C.

Combustion analysis

Calc. (in %): C 71.53, H 7.95, Cl 5.71, N 4.51;
Found (in %): C 71.82, H 8.07, Cl 5.29, N 4.45.

14.25 g of the dye acid chloride prepared in this way are stirred with 160 g of anhydrous o-dichlorobenzene and heated to 80° C. The clear, dark red solution is treated at this temperature with a warm solution, at 70° C., of 2.05 g of 2,5-dichloro-1,4-phenylenediamine in 150 ml of o-dichlorobenzene, producing a red precipitate. The red suspension formed is heated to 120° C., with stirring, and stirring is continued for 16 hours at this temperature. The product is isolated hot by suction filtration and washed with warm o-dichlorobenzene and then with hot methanol. Drying of the product under vacuum at 60° C. gives 14.1 g (91.5% of theory) of a soft-grained red powder which colors e.g. polyethylene, polyvinyl chloride and polyamide in intense red shades of excellent heat and light stability. The pigment has the following structure:

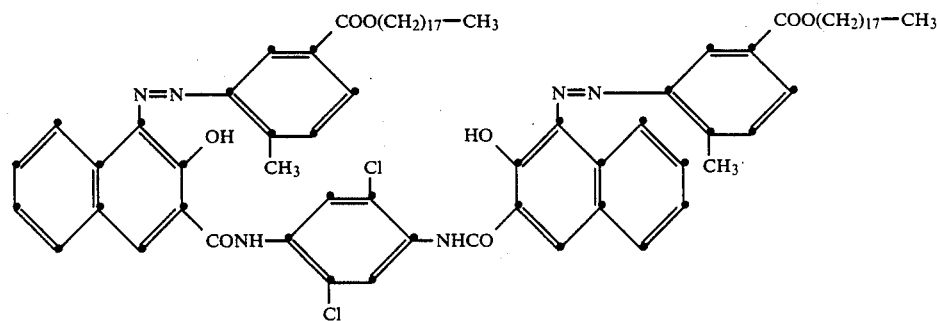

and gives the following combustion analysis:
Calc. (in %): C 71.35, H 7.64, Cl 5.27, N 6.24;
Found (in %): C 71.29, H 7.65, Cl 5.43, N 6.17.

EXAMPLE 1B

If the procedure is the same as in the above Example, except that the azo dye carboxylic acid chloride indicated in said Example is replaced with a corresponding amount of the azo dye carboxylic acid chloride of the formula

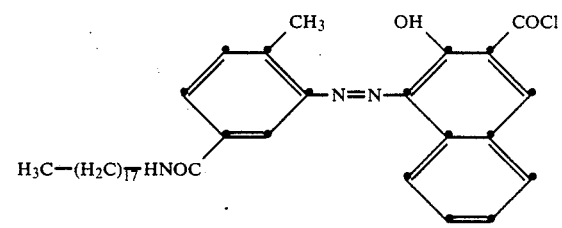

and the 2,5-dichloro-1,4-phenylenediamine is replaced with a corresponding amount of 2,5-dimethyl-1,4-phenylenediamine, a red powder of the following formula:

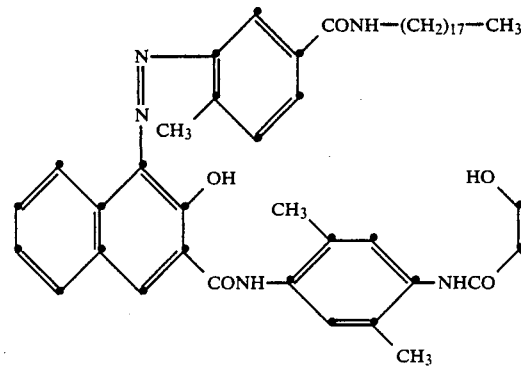

is obtained.

Combustion analysis

Calc. (in %): C 75.54, H 8.50, N 8.59;
Found (in %): C 75.19, H 8.48, N 8.56.

EXAMPLES 2–37

The following Table contains further pigments which can be prepared by the process of Example 1 above by coupling the diazo compound of the amines listed in column I with 2-hydroxy-3-naphthoic acid, converting the resulting azo dye carboxylic acid into the corresponding acid chloride and condensing the latter with the diamines indicated in column II in a molar ratio of 2:1. Column III characterizes the shade of the polyvinyl chloride sheet colored with the resulting pigments according to Example 63.

| Ex. | I | II | III |
|---|---|---|---|
| 2 | stearyl 4-methyl-3-amino-benzoate | 2,5-dimethyl-p-phenylenediamine | scarlet |
| 3 | stearyl 4-methyl-3-amino-benzoate | p-phenylenediamine | scarlet |
| 4 | stearyl 4-methyl-3-amino-benzoate | 2-chloro-p-phenylenediamine | red |
| 5 | stearyl 4-methyl-3-amino-benzoate | 2-chloro-5-methyl-p-phenylenediamine | scarlet |
| 6 | stearyl 4-methyl-3-amino-benzoate | 2,5-dimethoxy-p-phenylenediamine | claret |
| 7 | stearyl 4-aminobenzoate | 2,5-dimethyl-p-phenylenediamine | reddish brown |
| 8 | distearyl 2-amino-terephthalate | 2,5-dimethyl-p-phenylenediamine | yellowish brown |
| 9 | stearyl 3-aminobenzoate | 2,5-dichloro-p-phenylenediamine | reddish orange |
| 10 | stearyl 3-aminobenzoate | 2,5-dimethoxy-p-phenylenediamine | brown |
| 11 | stearyl 3-aminobenzoate | 2-chloro-5-methyl-p-phenylenediamine | orange |
| 12 | stearyl 4-chloro-3-amino-benzoate | p-phenylenediamine | yellowish brown |
| 13 | stearyl 4-chloro-3-amino-benzoate | 2,5-dichloro-p-phenylenediamine | scarlet |
| 14 | stearyl 4-chloro-3-amino-benzoate | 2,5-dimethyl-p-phenylenediamine | red |
| 15 | stearyl 4-chloro-3-amino-benzoate | 2-chloro-5-methyl-p-phenylenediamine | red |
| 16 | stearyl 4-chloro-3-amino-benzoate | 2,5-dimethoxy-p-phenylenediamine | brown |
| 17 | stearyl 4-chloro-3-amino-benzoate | p-phenylenediamine | carmine |
| 18 | stearyl 4-methoxy-3-amino-benzoate | 2,5-dichloro-p-phenylenediamine | scarlet |
| 19 | stearyl 4-methoxy-3-amino-benzoate | 2,5-dimethyl-p-phenylenediamine | carmine |
| 20 | stearyl 4-methoxy-3-amino-benzoate | 2-chloro-5-methyl-p-phenylenediamine | carmine |
| 21 | stearyl 4-methoxy-3-amino-benzoate | 2,5-dimethoxy-p-phenylenediamine | red |
| 22 | n-decanyl 4-methyl-3-aminobenzoate | 2,5-dichloro-p-phenylenediamine | red |
| 23 | n-decanyl 4-methyl-3-aminobenzoate | 2,5-dimethyl-p-phenylenediamine | red |
| 24 | n-decanyl 4-methyl-3-aminobenzoate | 2,5-dimethoxy-p-phenylenediamine | dark red |
| 25 | n-decanyl 4-methyl-3-aminobenzoate | 2-chloro-5-methyl-p-phenylenediamine | red |
| 26 | n-tetradecanyl 4-methyl-3-aminobenzoate | 2,5-dichloro-p-phenylenediamine | carmine red |
| 27 | n-tetradecanyl 4-methyl-3-aminobenzoate | 2,5-dimethyl-p-phenylenediamine | red |
| 28 | lauryl 4-methyl-3-aminobenzoate | 2,5-dichloro-p-phenylenediamine | red |
| 29 | lauryl 4-methyl-3-aminobenzoate | 2,5-dimethyl-p-phenylenediamine | red |
| 30 | stearyl 4-methyl-3-aminobenzoate | 1,5-diamino-naphthalene | carmine |
| 31 | stearyl 4-methoxy-3-aminobenzoate | 1,5-diamino-naphthalene | carmine |
| 32 | n-decanyl 4-methyl-3-aminobenzoate | 1,5-diamino-naphthalene | carmine |
| 33 | n-tetradecanyl 4-methyl-3-aminobenzoate | 1,5-diamino-naphthalene | carmine |
| 34 | stearyl 4-methyl-3-aminobenzoate | 3,3'-dichloro-benzidine | orange |
| 35 | stearyl 4-methoxy-3-aminobenzoate | 3,3'-dichloro-benzidine | red |
| 36 | stearyl anthranilate | 2,5-dichloro-p-phenylenediamine | orange |
| 37 | lauryl anthranilate | 2,5-dichloro-p-phenylenediamine | orange |

EXAMPLE 38

3.55 g of the disazo dicarboxylic acid dichloride of the formula

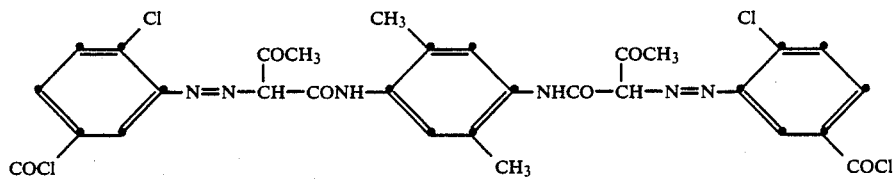

and 8.8 g of stearyl alcohol (97%) are heated to 140° C. in 200 g of o-dichlorobenzene and stirred at this temperature for 6 hours, during which time the reddish brown suspension dissolves. The turbid brown solution formed is cooled to 100° C. and filtered hot. There is practically no residue. The filtrate produces a yellow precipitate. 120 g of 96% ethyl alcohol are added and the product is isolated by suction filtration. It is washed with 150 g of 96% ethyl alcohol and dried under vacuum at 60° C. to give 5.4 g (92.6% of theory) of an intense yellow powder of the formula

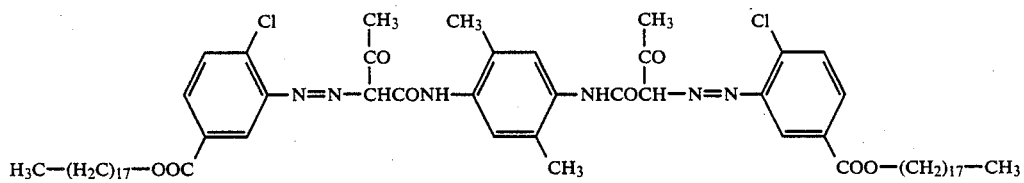

Analysis

Calc. (in %): C 67.50, H 8.41, Cl 6.04, N 7.16;
Found (in %): C 67.35, H 8.35, Cl 6.25, N 7.16.

The product of this Example colors polyethylene, polyamide and polyvinyl chloride in intense yellow shades of excellent heat and light stability.

EXAMPLES 39–44

The Table below describes further compounds which can be prepared by the process of Example 1 by coupling the diazo compound of the amines listed in column I with the bis-acetoacetic acid arylide of the diamines listed in column II, converting the resulting disazo dye dicarboxylic acid into its corresponding dicarboxylic acid dichloride and then condensing the latter with stearyl alcohol. Column III indicates the shade of the PVC sheet colored with these pigments.

| Ex. | I | II | III |
|---|---|---|---|
| 39 | 4-chloro-3-amino-benzoic acid | p-phenylenediamine | greenish yellow |
| 40 | 4-chloro-3-amino-benzoic acid | 2-chloro-p-phenylenediamine | greenish yellow |
| 41 | 4-methoxy-3-amino-benzoic acid | 2,5-dimethyl-p-phenylenediamine | yellow |
| 42 | 4-chloro-3-amino-benzoic acid | 2-chloro-5-methyl-p-phenylenediamine | greenish yellow |
| 43 | 4-chloro-3-amino-benzoic acid | 2,5-dichloro-p-phenylene- | greenish |
| 44 | 4-methyl-3-amino-benzoic acid | 2,5-dimethyl-p-phenylenediamine | yellow yellow |

EXAMPLE 45

4.7 g of stearyl 4-chloro-3-aminobenzoate and 1.9 g of 3,3'-dimethyl-4,4'-diacetoacetylaminobiphenyl are heated to 63° C. in 200 g of acetic acid. The clear yellow solution formed is cooled to 53° C. and 2.86 ml of a 4 N sodium nitrite solution are quickly added dropwise at this temperature, producing a thick orange precipitate. The orange suspension is stirred for 3 hours at 56° C., cooled to room temperature and filtered. The material on the suction filter is washed with 200 g of 96% ethyl alcohol and dried under vacuum at 60° C. to give 5.8 g (93.55% of theory) of a yellowish orange powder of the formula

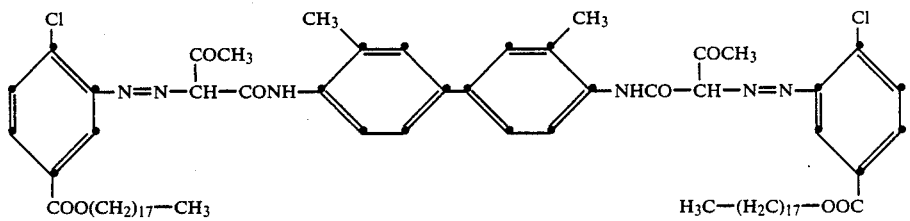

Analysis

Calc. (in %): C 69.15, H 8.22, Cl 5.67, N 6.72;
Found (in %): C 69.43, H 8.23, Cl 5.433, N 6.61.

This product colors polyethylene, polyamide and polyvinyl chloride in intense yellow shades. These colorings have excellent heat and light stability.

EXAMPLES 46–61

The Table below describes further compounds which ar obtained by coupling the diazo compound of the bases listed in column I with the bis-acetoacetic acid arylide of the diamines listed in column II in a molar ratio of 2:1. Column III indicates the shade of the PVC sheet colored with these pigments.

| Ex. | I | II | III |
|---|---|---|---|
| 46 | 4-chloro-3-amino-benzoic- | 2,5-dimethyl-p- | yellow |

-continued

| Ex. | I | II | III |
|---|---|---|---|
|  | acid stearylamide | phenylenediamine |  |
| 47 | stearyl 4-methyl-3-aminobenzoate | p-phenylenediamine | greenish yellow |
| 48 | stearyl 3-aminobenzoate stearylester | 2,5-dimethyl-p-phenylenediamine | greenish yellow |
| 49 | stearyl 2,4-dichloro-3-aminobenzoate | 2,5-dimethyl-p-phenylenediamine | greenish yellow |
| 50 | stearyl 4-phenoxy-3-aminobenzoate | 2,5-dimethyl-p-phenylenediamine | orange-yellow |
| 51 | stearyl 5-nitro-3-aminobenzoate | 2,5-dimethyl-p-phenylenediamine | orange |
| 52 | stearyl 4-chloro-3-aminobenzoate | 2,5-diethoxy-p-phenylenediamine | orange |
| 53 | n-decanyl 4-methyl-3-aminobenzoate | 2,5-dimethyl-p-phenylenediamine | yellow |
| 54 | lauryl 4-methyl-3-aminobenzoate | 2,5-dimethyl-p-phenylenediamine | yellow |
| 55 | n-tetradecanyl 4-methyl-3-aminobenzoate | 2,5-dimethyl-p-phenylenediamine | yellow |
| 56 | stearyl 4-chloro-3-aminobenzoate | 3,3'-dichloro-benzidine | greenish yellow |
| 57 | stearyl 4-chloro-3-aminobenzoate | 3,3'-dimethoxy-benzidine | orange |
| 58 | stearyl 4-chloro-3-aminobenzoate | 2,5-diamino-naphthalene | yellow |
| 59 | stearyl 4-amino-benzoate | 2,5-dimethyl-p-phenylenediamine | orange |
| 60 | distearyl 2-amino-terephthalate | p-phenylene-diamine | yellow |
| 61 | distearyl 2-amino-terephthalate | 2,5-dimethyl-p-phenylenediamine | yellow orange |

EXAMPLE 62

A mixture of 1.0 g of the disazo condensation pigment obtained according to Example 1A, 1.0 g of the antioxidant ®IRGANOX 1010 (CIBA-GEIGY AG) and 1000 g of polyethylene HD granules (®VESTOLEN A60-16, HUELS) is premixed for 15 minutes in a 3 1 glass flask on a roller gear bed. The mixture is then extruded twice through a single-screw extruder. The resulting granules are then converted to plates on an injection molding machine (®Allround Aarburg 200) at 250° C. with a dwell time of 5 minutes. The resulting plates have uniformly intense, bluish red colorations of high purity and excellent light stability.

EXAMPLE 63

40 mg of the disazo condensation pigment obtained according to Example 1A are mixed thoroughly with 7.3 ml of dioctyl phthalate and 13.3 g of a stabilized polyvinyl chloride of the ®LONZA E-722 type in a glass beaker using a glass rod. The mixture obtained is then processed on a roller mill for 5 minutes at 160° C. to form a thin sheet. The PVC sheet produced exhibits a very intense, bluish red coloration of high purity and very good light stability. The pigment has excellent dispersibility.

By an analogous procedure, the pigments obtained according to the invention in Examples 2 to 61 can also be used to color PVC, resulting in equally good properties.

EXAMPLE 64

1000 g of polypropylene granules (®DAPLEN PT-55, Chemie LINZ) and 1.0 g of the disazo condensation pigment obtained according to Example 1A are mixed for 15 minutes in a 3 1 flask on a roller gear bed. The mixture is then extruded twice through a single-screw extruder and subsequently granulated. The resulting granules are melt-spun at 280°-285° C. The fibers colored in this way have a very good light stability and excellent textile fastness properties such as fastness to rubbing and wet fastness to detergents and solvents. The pigment has excellent heat stability during the spinning process at 285° C.

EXAMPLE 65

100 g of the polyamide ®GRILON A 25 (EMS-Chemie AG, Zurich) and 0.2 g of the disazo condensation pigment obtained according to Example 1A are mixed thoroughly on a laboratory turbomixer (W. A. Bachofen, Basle) for 20 minutes. The mixture is then extruded on a single-screw extruder at 240° C. The resulting ribbon has a red coloration and exhibits good light stability properties.

EXAMPLE 66

If the procedure is analogous to that described in Example 62, except that 10 g of the titanium dioxide ®KRONOS RN-57-P (KRONOS Titan GmbH) are used in addition to the colored pigment, red plates with equally good heat stability properties are obtained. The plates injection-molded in the temperature range from 200° to 280° C. do not exhibit any color variations after cooling.

What is claimed is:

1. A compound of formula I:

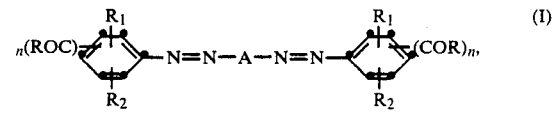

wherein R is a radical of the formula —OR$_3$ or —NHR$_3$, A is a radical of formula II or III:

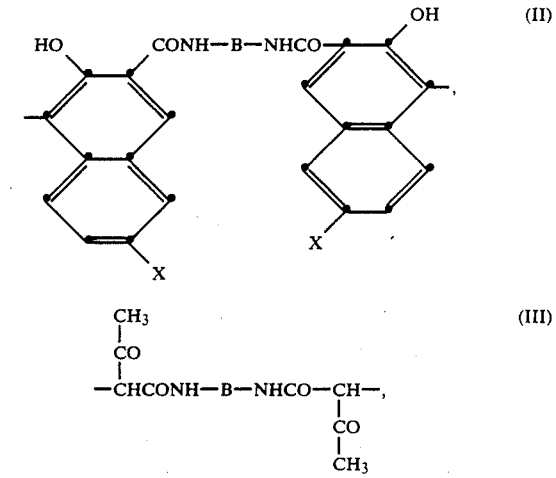

B is a radical of the formula

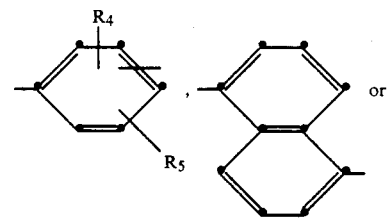

-continued

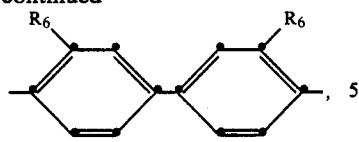

n is the number 1 or 2, $R_1$ is —H or —Cl, $R_2$ is —H, halogen, —$NO_2$, —CN, $C_1$-$C_4$ alkyl, $C_1$-$C_4$ alkoxy, —$CF_3$, $C_2$-$C_5$ alkoxycarbonyl or —CONH-phenyl, —NHCO-phenyl or phenoxy which is unsubstituted or substituted on the phenyl ring by one or two chlorine atoms or one or two methyl, methoxy or ethoxy groups, $R_3$ is alkyl containing at least 10 C atoms, $R_4$ and $R_5$ are each independently of the other —H, halogen, —$NO_2$, —CN, —$CF_3$, $C_1$-$C_4$ alkyl or $C_1$-$C_4$ alkoxy, $R_6$ is —H, —Cl, —Br, —$CH_3$ or —$OCH_3$ and X is —H, —Br, —$OCH_3$, —CN or —$NO_2$.

2. A compound of formula I according to claim 1 in which formula I has the following structure:

and the groups R, $R_1$, $R_2$ and A are as defined in claim 1.

3. A compound of formula I according to claim 1 in which formulae II and III have the following structures:

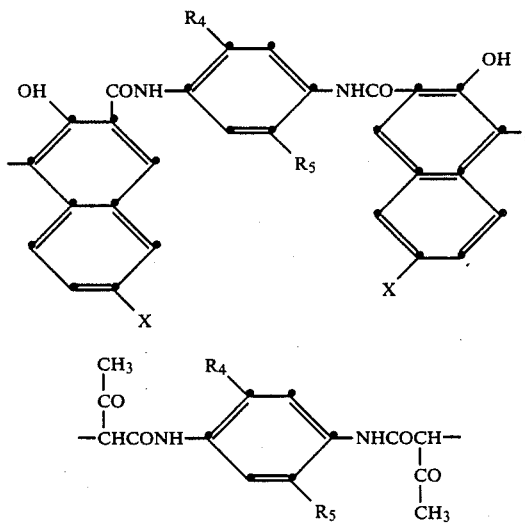

and the groups $R_4$, $R_5$ and X are as defined in claim 1.

4. A compound of formula IV according to claim 1:

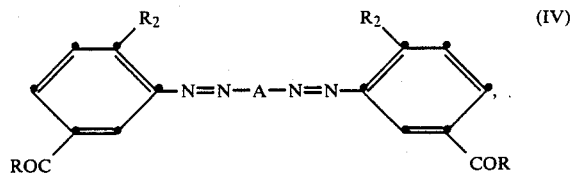

wherein A is a radical of formula V or VI:

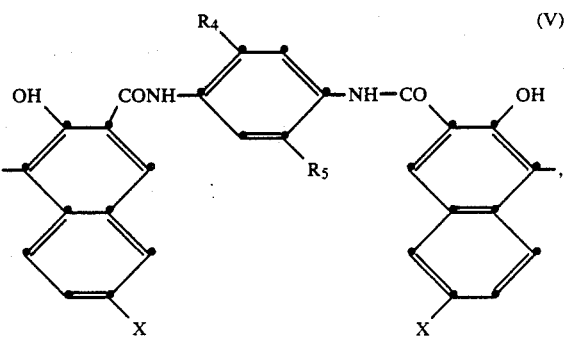

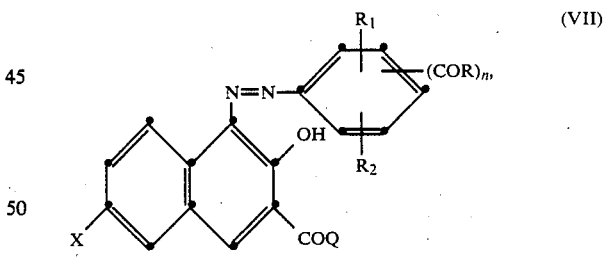

R is a radical of the formula —$OR_3$ or —$NHR_3$, $R_2$ is —H, —Cl, —$CH_3$, —$OCH_3$, —$OC_2H_5$, —$COOCH_3$, —$COOC_2H_5$ or —$OC_4H_5$, $R_3$ is $C_{12}$-$C_{35}$ alkyl and $R_4$ and $R_5$ are each independently of the other —H, —Cl, —$CH_3$, —$OCH_3$ or —$OC_2H_5$.

5. A compound of formula IV according to claim 4 in which R is a radical of the formula —$OR_3$.

6. A compound of formula IV according to claim 4 in which A is a radical of formula V.

7. A compound of formula IV according to claim 4 in which A is a radical of formula V, $R_2$ is —Cl, —$CH_3$ or —$OCH_3$, $R_3$ is $C_{12}$-$C_{18}$ alkyl and $R_4$ and $R_5$ are each independently of the other —H, —Cl, —$CH_3$ or —$OCH_3$.

8. A compound of formula VII:

wherein n is the number 1 or 2, R is a radical of the formula —$OR_3$ or —$NHR_3$, $R_1$ is —H or —Cl, $R_2$ is —H, halogen, —$NO_2$, —CN, $C_1$-$C_4$ alkyl, $C_1$-$C_4$ alkoxy, —$CF_3$, $C_2$-$C_5$ alkoxycarbonyl or —CONH-phenyl, —NHCO-phenyl or phenoxy which is unsubstituted or substituted on the phenyl ring by one or two chlorine atoms or one or two methyl, methoxy or ethoxy groups, $R_3$ is alkyl containing at least 10 C atoms, X is —H, —Br, —$OCH_3$, —CN or —$NO_2$ and Q is —OH or halogen.

9. A compound according to claim 8 in which Q is —Cl.

10. A compound according to claim 8 in which formula VII has structure VIII:

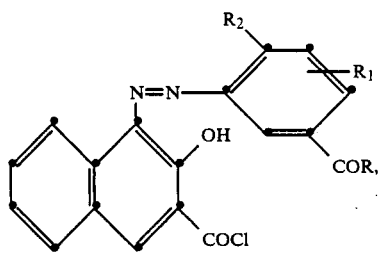 (VIII)
wherein R, $R_1$ and $R_2$ are as defined in claim 8.
11. A compound according to claim 10 in which $R_1$ is —H, $R_2$ is —Cl, —$CH_3$ or —$OCH_3$ and R is a radical of the formula —$OR_3$, $R_3$ being $C_{12}$–$C_{18}$ alkyl.
* * * * *